United States Patent [19]

Bergmann et al.

[11] 4,377,147
[45] Mar. 22, 1983

[54] INTERNAL COMBUSTION ENGINE

[75] Inventors: Horst Bergmann, Esslingen; Hans Pracht, Weinstadt; Klaus-Dieter Holloh, Kernen, all of Fed. Rep. of Germany

[73] Assignee: Daimler-Benz Aktiengesellschaft, Stuttgart, Fed. Rep. of Germany

[21] Appl. No.: 299,926

[22] Filed: Sep. 8, 1981

[30] Foreign Application Priority Data

Sep. 5, 1980 [DE] Fed. Rep. of Germany ....... 3033386

[51] Int. Cl.³ .................. F02B 43/00; F02M 21/04
[52] U.S. Cl. .................. 123/527; 123/577; 123/505; 48/180 C; 261/69 R; 261/51
[58] Field of Search ............ 123/525, 526, 527, 529, 123/577, 505, 462, 463, 27 GE; 261/16, 69 R, 51; 48/180 C, 184

[56] References Cited

U.S. PATENT DOCUMENTS

| 2,664,872 | 1/1954 | Ericson et al. | 123/529 |
| 3,105,478 | 10/1963 | Lyon | 123/505 |
| 3,370,578 | 2/1968 | Spelts | 123/575 |
| 3,472,494 | 10/1969 | Seiden | 261/69 R |
| 3,596,644 | 8/1971 | Hutchins | 123/413 |
| 4,290,402 | 9/1981 | Bergmann | 123/527 |

FOREIGN PATENT DOCUMENTS

| 55-78148 | 6/1980 | Japan | 123/527 |
| 1370619 | 10/1974 | United Kingdom | 123/27 GE |

Primary Examiner—Charles J. Myhre
Assistant Examiner—E. Rollins Cross
Attorney, Agent, or Firm—Craig & Burns

[57] ABSTRACT

An internal combustion engine driven by a gaseous fuel, with quantity regulation in a lower load range and quality regulation in an upper load range. A gas pressure regulator is provided for controlling a gas flow to an air-gas mixer, with a throttle valve actuatable by an accelerator pedal being arranged in an intake line downstream of the air-gas mixer, whereby the gas pressure regulator is movable in a closing direction through a control line, by a diaphragm by vacuum prevailing in the intake line in a vicinity of the throttle valve. A control valve, influenced by the accelerator in the quality control range, is disposed in a control line. The control line branches off the intake line upstream of the throttle valve or off the air-gas mixer. A throughput or through-flow cross section in the control valve decreases with increasing loads in a direct relationship to a position of the accelerator until the control valve closes at full load. The control line between the control valve and gas pressure regulator is connected to outside air through a fixed throttle.

23 Claims, 3 Drawing Figures

INTERNAL COMBUSTION ENGINE

The present invention relates to an internal combustion engine and, more particularly, to an internal combustion engine driven by a gaseous fuel, with the engine having a fuel quantity regulation in a lower load range of operation and a quality fuel regulation in an upper load range, and with a gas pressure regulator for a gas flow to an air-gas mixer, and with a throttle valve, actuatable by an accelerator or gas pedal being disposed in an intake line downstream of the air-gas mixer whereby the gas pressure regulator is movable in a closing direction through a control line by way of a diaphragm acted upon by a vacuum prevailing in an intake line in a vicinity of the throttle valve, as well as a control valve disposed in the control line and being influenced by the accelerator or gas pedal in the quality regulation or control range of operation of the engine.

An internal combustion engine of the aforementioned type is disclosed in, for example, German Patent Application No. P 29 48 449.9-13, wherein a magnitude of a vacuum which acts upon the diaphragm of the gas pressure regulator through the control line depends only on a position of the accelerator or gas pedal. The vacuum in the intake line downstream of the throttle valve serves only as a vacuum source and the magnitude of this vacuum has no effect upon the magnitude of the vacuum in the gas pressure regulator. A disadvantage of this proposed construction resides in the fact that a volume of gaseous fuel supplied is regulated in the quality control range only by the load of the engine and not by the rotational speed of the internal combustion engine.

The aim underlying the present invention essentially resides in providing an internal combustion engine having an improved gas supply regulation especially in a quality control range, as well as an improved combustion process in the engine.

In accordance with advantageous features of the present invention, an internal combustion engine of the aforementioned type is provided wherein the control line branches off an intake line upstream of the throttle valve or off the air-gas mixture. The through flow cross section in the control valve decreases with increasing loads in a direct relationship to the position of the accelerator or gas pedal until it closes at full load. Additionally, the control line between the control valve and gas pressure regulator is connected with outside air through a fixed throttle.

By virtue of the features of the present invention, a vacuum acting upon the gas pressure regulator is a direct function of the vacuum in the intake line upstream of the throttle valve and thus is a function of the rotational speed of the internal combustion engine. Moreover, the vacuum is modified in the quality control range in the regulator valve as a direct function of the accelerator or gas pedal position whereby the influence of the load of the internal combustion engine on the gas supply in this control range is ensured. Moreover, a connecting of the control line through a fixed throttle with the outside air affects the absolute level of the vacuum acting on the gas pressure regulator diaphragm without influencing its dependence upon the rotational speed and load range of the engine.

In order to ensure in a simple fashion that the control valve is actuated by the accelerator or gas pedal only in the quality control range, in accordance with the present invention, a slider is provided having a free travel or idle path in the quality control range, with the slider being disposed in a rod between the accelerator or gas pedal and the control valve.

In accordance with further features of the present invention, a three/two-way valve is disposed in the control line between the control valve and gas pressure regulator, through which valve the gas pressure regulator is connectible with the intake line downstream of the throttle valve or a vacuum tank. By virtue of these features of the present invention, it is ensured that an increased vacuum may act upon the gas pressure regulator in certain cases such as, for example, when the internal combustion engine is shut off or pushed thereby interrupting the fuel feed.

In order to provide an improvement in the combustion process by adjusting an ignition timing to the engine to the load of the engine in the quality control range, according to the present invention, a drive lever having a rod engages between the slider and control valve following a certain amount of free travel, with the drive lever being connected with a device for adjusting the ignition timing in a distributor. With the rod coupled to the accelerator or gas pedal, it is possible to adjust the ignition timing in the distributor, with a conventional dependence of the ignition point setting upon the vacuum not being applicable in the quality control range of operation of the engine.

Advantageously, in accordance with further features of the present invention, a stop is provided for the drive lever, with the position being dependent upon a vacuum in the diaphragm chamber. By virtue of these features, it is ensured that an adjustment of the ignition timing in an early range can only take place when a sufficiently high vacuum prevails in the diaphragm chamber thereby eliminating a knocking caused by the combustion process in the internal combustion engine.

Advantageously, according to the present invention, a connection is provided between a rod part that leads to the accelerator or gas pedal and rod parts which lead to the throttle valve and control valve, with the connection being overloadable and ineffective in case of malfunction such as excessively high engine rotational speed. By virtue of this arrangement, there is a clear relationship between the various parts of the rods between the accelerator or gas pedal, throttle valve, and regulator valve; however, in case of certain malfunctions, the fuel supply to the internal combustion engine may be interrupted without a positioning of the accelerator or gas pedal having any influence.

Accordingly, it is an object of the present invention to provide an internal combustion engine driven by a gaseous fuel which avoids, by simple means, shortcomings and disadvantages encountered in the prior art.

Another object of the present invention resides in providing an internal combustion engine driven by a gaseous fuel which improves the regulation of a gas supply especially in a quality control range operation of the engine.

Yet another object of the present invention resides in providing an internal combustion engine driven by a gaseous fuel which engine has an improved combustion process.

A still further object of the present invention resides in providing an internal combustion engine driven by a gaseous fuel which functions realiably under all operating or load conditions.

A still further object of the present invention resides in providing an internal combustion engine driven by a gaseous fuel which is simple in construction and therefore relatively inexpensive to manufacture.

These and other objects, features, and advantages of the present invention will become more apparent from the following description when taken in connection with the accompanying drawings which show, for the purposes of illustration only, two embodiments in accordance with the present invention, and wherein.

Figure 1:
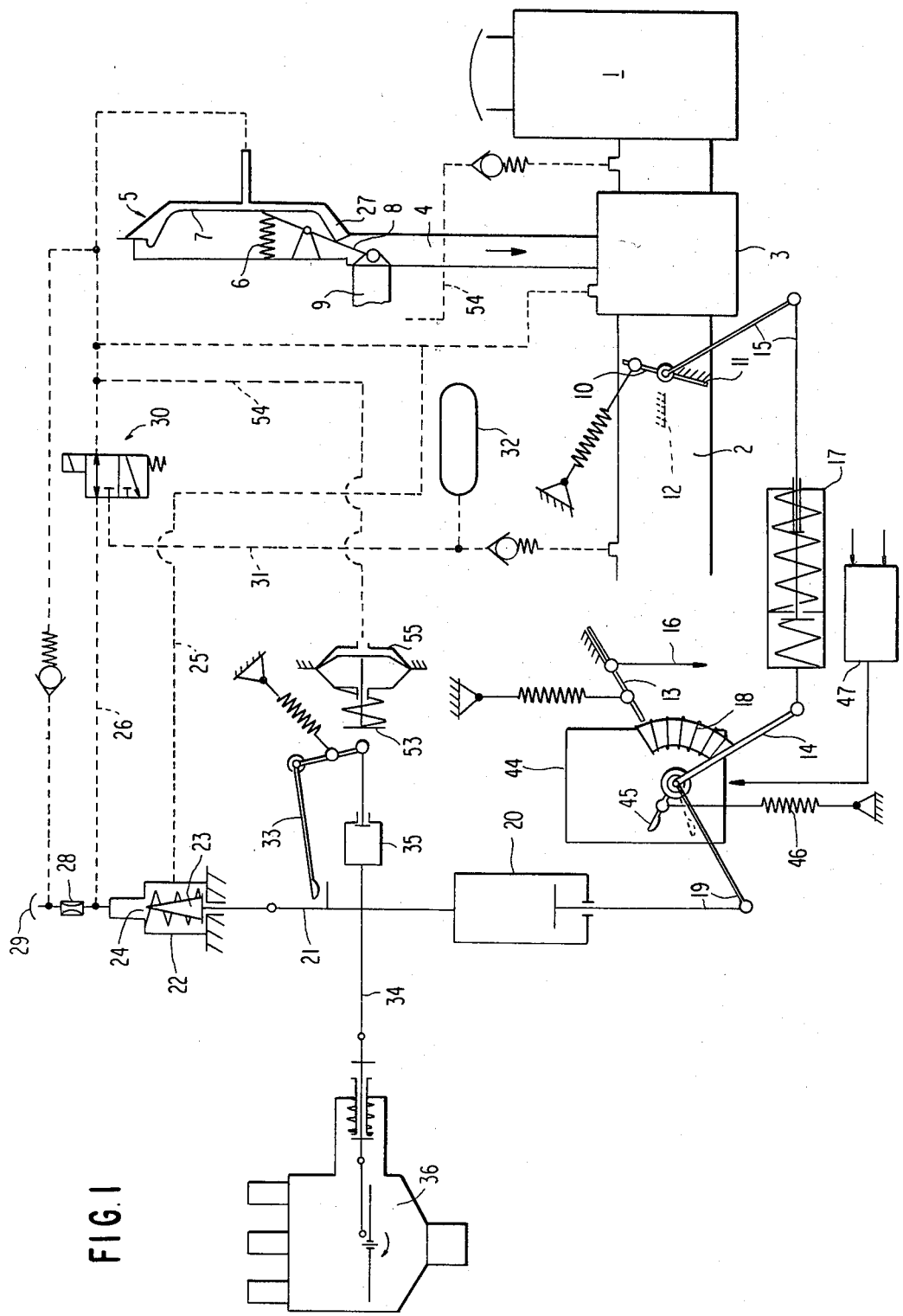
FIG. 1 is a partially schematic view of a fuel feed regulation and ignition timing adjustment arrangement for a gaseous fuel powered internal combustion engine constructed in accordance with the present invention.

Referring now to the drawings wherein like reference numerals are used throughout the various views to designate like parts and, more particularly, to FIG. 1, according to this figure, an air intake line 2 of an internal combustion engine (not shown) is connected to an air filter 1, with an air-gas mixer or distributor 3 being disposed in the intake line 2. The air-gas mixer 3 is connected by way of a line 4 with a gas pressure regulator generally designated by the reference numeral 5. The gas pressure regulator includes a diaphragm 7 and a spring 6 acting on the diaphragm 7. A vacuum in the line 4 operates against the biasing force of the spring 6 and moves the diaphragm 7 in an opening direction. The diaphragm 7 controls, by way of a rod 8, a gas feed from a converter or evaporator (not shown) through a line 9 to the line 4.

A throttle valve 10 is disposed in the intake line 2 at a position downstream of the air-gas mixer or distributor 3. An idle stop 11 and fully open stop 12 for the throttle valve 10 are disposed in the intake line 2. The throttle valve 10 is actuated through a rod of linkage system 13, 14, 15, by an accelerator or gas pedal designated by the arrow 16. A sleeve 17 is incorporated or interposed between the rod or linkage parts 14, 15. The later linkage system provides a rigid connection so long as the throttle valve moves between the idle stop 11 and fully open stop 12; however, the rod or linkage system may be subjected to an excess pressure when the throttle valve 10 is against the fully open stop 12 so as to result in a limited relative displacement between the rod or linkage parts 14, 15. A connection between the rod or linkage parts 13, 14 is effected by a spring 18 which, in a normal case, acts like a rigid connection.

The rod or linkage part 14 is firmly connected to an additional rod or linkage part 19. The additional rod or linkage part 19 abuts or is connected with a further rod or linkage part 21, connected with a regulator valve 22, through a slider 20. The regulator valve 22 includes a conical throttle element 23, with the throttle element 23 fitting into the opening 24 in the regulator valve 22. A cross section of the opening 24 changes as a result of a lengthwise or longitudinal displacement of the throttle element 23 effected by a displacement of the rod or linkage part 21. The opening 24 is connected by a control line 25 to the air gas mixer 3 and by a control line 26 with the gas pressure regulator 5. The control line 26 terminates in a chamber 27 which is delimited or defined by the diaphragm 7 of the gas pressure regulator 5 so that a vacuum prevailing in the chamber 27 attempts to effect a movement of the diaphragm 6 which will reduce the gas supply. The control line 26 is connected or communicates with outside air through a fixed throttle 28 and a small air filter 29.

When the internal combustion engine is running, a movement of the accelerator or gas pedal 16 from an idle position moves the throttle valve 10 from the idle stop 11 to the fully open stop 12 by the rigidly connected rod or linkage parts 13, 14, 15. The rod or linkage part 19 executes an idle movement which is not transmitted to the regulator valve 22, by virtue of the slider 20 so that the cross section of the opening 24 remains the same. A volume of gas supplied depends only upon the vacuum in the air-gas mixer 3 transmitted through the control lines 25, 26 to the gas pressure regulator 5 in addition to an influence of the vacuum in the line 4, which vacuum is a function of a load and rotational speed of the engine so that a pure fuel quantity control takes place in this load or operational range of the engine.

When the accelerator or gas pedal 16 is moved further toward a full load position, the sleeve or pull over element 17 is displaced or pulled over because the throttle valve 10 is abutted against the fully open stop 12 and the rod or linkage part 14 executes a free travel while, on the other hand, the rod parts or links 19 and 21, after bridging the slider 20 are firmly connected together so that the throttle element 23 reduces the opening 24. The RPM or rotational speed-dependent and load-independent vacuum in the air-gas mixer 3 thus acts after a load-dependent modification in the regulator valve 22 in the gas pressure regulator 5. Therefore, in this load or operational range of the engine, a pure quality regulation takes place with a low-independent air throughflow through the air-gas mixer 3. At a full load, the opening 24 is closed by the throttle element 23 and outside air pressure prevails in the control line 26 due to the connection through the fixed throttle 28 and the maximum quantity of gas is supplied.

A three/two-way valve generally designated by the reference numeral 30 is incorporated in the control line 26. The valve 30 is adapted to connect the gas pressure regulator 5 through line 31 with the intake line 2 at a position downstream of the throttle valve 10 or with a vacuum tank 32 so as to permit a gas supply to be interrupted when, for example, pushing the engine.

A drive lever 33 is movable by the rod or linkage part 21. The drive lever 33 is connected by a rod or linkage part generally designated by the reference numeral 34 and a slider 35 with a means for changing an ignition timing of a distributor 36.

Figure 2:
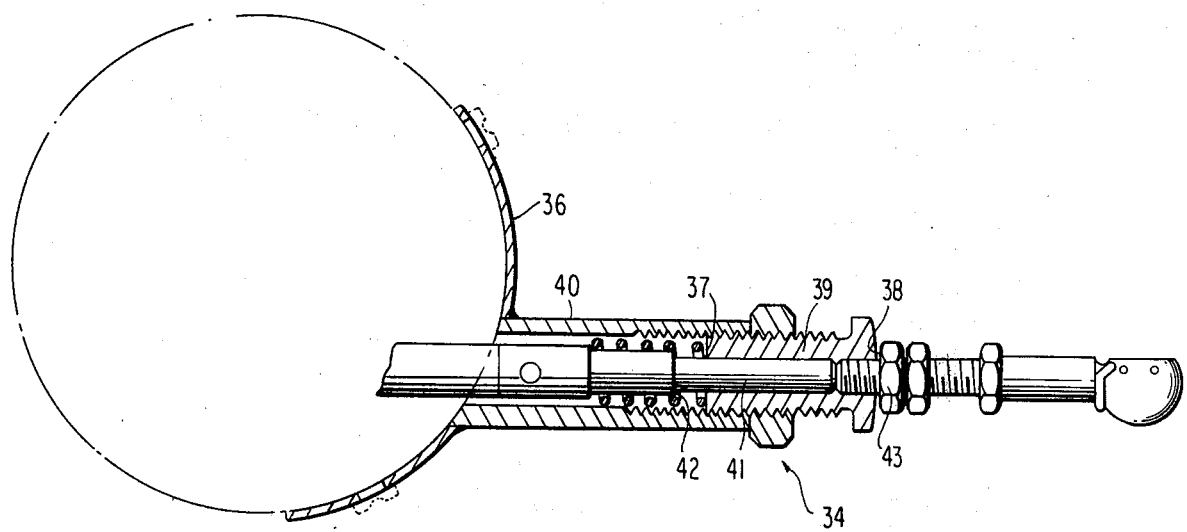
FIG. 2 is an enlarged and detailed view of a portion of the ignition timing adjustment system.

As shown most clearly in FIG. 2, the rod 34 is provided with two stops 37, 38 which define or limit the ignition timing adjustment. The stop 37 is a partial load stop and is formed by an inner end of a hollow threaded pin 39. The hollow threaded pin 39 is threadably inserted into a tube 40 connected to the distributor 36. A rod 41 is provided with a bead 42 which is adapted to strike or abut the partial load stop 37. The stop 38 is a full load stop and is formed by an outer end of the hollow threaded pin 39. A nut 43 threaded on the rod 41 is adapted to strike or abut against the full load stop 38. The partial load stop 37 and full load stop 38 may be continuously adjusted by simply turning the threaded pin 39 and the nut 43.

In order to impede or prevent an advancement of the ignition timing in the event of a malfunction, as shown in FIG. 1, a stop 53 is provided for controlling or stopping a movement of the drive lever 33. The position of the stop 53 is controlled by a vacuum in the control line 26 and therefore in the pressure chamber 27 through a line 54 and a servo motor 55. This arrangement ensures that the ignition timing will only be advanced when there is a sufficiently high vacuum in the pressure chamber 27 thereby eliminating the possibility of the internal combustion engine being damaged by excessive knocking in the combustion process.

In special situations such as, for example, when the internal combustion engine is operating at an excessive rotational speed, the connection between the rod or linkage part 13 and rod or linkage parts 14 and 19 may be rendered ineffective whereby a servo motor 44 acting on dog 45 moves the rod or linkage parts 14 and 19 against the force of the spring 18 to an idle position. If the servo motor 44 fails, a spring 46 may be provided so as to accomplish this task of moving the rod or linkage parts 14, 19 to the idle position. The servo motor 44 may be controlled by an electronic control means 47, of conventional construction, in which the rotational speed and other operating parameters of the internal combustion engine, fed from suitable sensors or detectors (not shown) are compared with predetermined set values for the sensed parameters.

Figure 3:
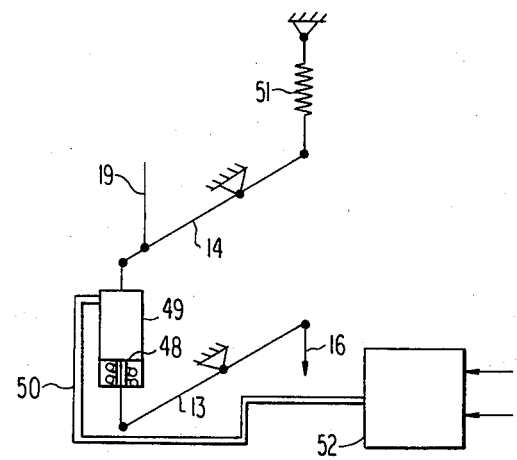
FIG. 3 is a schematic representation of another embodiment of a fuel feed regulation arrangement for regulating fuel at an excessive rotational speed of an internal combustion engine constructed in accordance with the present invention.

As shown most clearly in FIG. 3, the connection between the rod or linkage parts 13, 14, 19 as well as the protection against excessive rotational speed may be accomplished in other ways such as, for example, electrically or pneumatically. More particularly, with a pneumatic arrangement, the accelerator or gas pedal 16 is connected, by way of a rod 13, to a piston 48 disposed in a cylinder 49, with the accelerator or gas pedal 16 by way of the rod 13 controlling the position of the piston 48. The rod or linkage parts 14 and 19 are connected to the cylinder 49.

In a normal operation, the cylinder 49 is filled with a liquid or compressed air so that the piston 48 and cylinder 49 are rigidly connected together. In the event of a malfunction, the cylinder 49 is emptied through a line 50 so that the rod or linkage parts 14 and 19 are moved to an idle position by a spring 51 independently of the position of the accelerator or gas pedal 16. The line 50 is connected to an electro-pneumatic or an electro-hydraulic control unit 52, of conventional construction, into which the rotational speed and other operating characteristics or parameters of the internal combustion engine are fed and compared with predetermined set values for the characteristics or parameters.

While we have shown and described only two embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. An internal combustion engine powered by a gaseous fuel, the engine comprising air intake means, an air-fuel mixer means arranged in the air intake means, a fuel pressure regulator means for controlling a flow of fuel to the mixer means, throttle valve means actuatable by an accelerator means arranged in the intake means downstream of the air-fuel mixer means, and means for regulating a quantity of fuel supplied to the engine during a low load operation of the engine and for regulating a quality of fuel during an upper load range of operation of the engine, characterized in that the means for regulating the quantity and quality of fuel includes a control line means branching off from the air intake means at a position upstream of the throttle valve means and adapted to be subjected to the vacuum prevailing at that position of the air intake means, a control valve means arranged in the control line means for controlling the fuel pressure regulator means, means for connecting the accelerator means with the control valve means for controlling a through-flow cross section of the control valve means in a direct relationship to a position of the accelerator means, and means for venting the control line means to outside air.

2. An internal combustion engine according to claim 1, characterized in that the fuel pressure regulator means includes a diaphragm means adapted to be acted upon by vacuum in the control line means so as to move the pressure regulator means in a closing direction, and in that the means for connecting the accelerator means with the control valve means are constructed so as to enable the accelerator means to influence the control valve means only in a quality control range of operation of the engine.

3. An internal combustion engine according to claim 2, characterized in that the control valve means is adapted to decrease the through-flow cross section thereof with increasing loads of the engine and to assume a closed position at a full load operation of the engine.

4. An internal combustion engine according to claim 3, characterized in that the means for venting includes a fixed throttle means.

5. An internal combustion engine according to claim 4, characterized in that the means for connecting the accelerator means with the control valve means includes means for enabling a free travel between the accelerator means and the control valve means in a quantity control range of operation of the engine.

6. An internal combustion engine according to claim 5, characterized in that the means for connecting the accelerator means includes a rod means arranged between the accelerator means and the control valve means, and in that the means for enabling a free travel between the accelerator means and the control valve means includes a slider means arranged in the rod means for enabling the free travel between the accelerator means and the control valve means.

7. An internal combustion engine according to claim 6, characterized in that a further valve means is disposed in the control line means at a position between the control valve means and the fuel pressure regulator means for enabling the fuel pressure regulator means to be connected to a vacuum source.

8. An internal combustion engine according to claim 7, characterized in that the vacuum source is the air intake means, and in that the fuel pressure regulator means is connected to the air intake means at a position downstream of the throttle valve means.

9. An internal combustion engine according to claim 7, characterized in that the vacuum source is a vacuum tank means.

10. An internal combustion engine according to claim 9, characterized in that the further valve means is a three/two-way valve.

11. An internal combustion engine according to one of claims 7, 8, 9, or 10, characterized in that means are provided for adjusting an ignition timing of the engine, and in that means are provided for connecting the ignition timing adjusting means with the accelerator means.

12. An internal combustion engine according to claim 11, characterized in that the means for connecting the ignition timing adjusting means with the accelerator means includes a drive lever means engageable with the rod means at a position between the slider means and control valve means following a predetermined amount of free travel.

13. An internal combustion engine according to claim 12, characterized in that means are provided for stopping the drive lever means, the stopping means are positioned in dependence upon a vacuum in a diaphragm chamber of the fuel pressure regulator means.

14. An internal combustion engine according to claim 13, characterized in that means are provided for rendering the connecting means between the accelerator means and the control valve means and a connection between the accelerator means and throttle valve means ineffective upon a malfunctioning of the engine.

15. An internal combustion engine according to claim 14, characterized in that the control line means branches off from the air intake means at the fuel mixer means.

16. An internal combustion engine according to claim 15, characterized in that the malfunction is an excessively high rotational speed of the engine.

17. An internal combustion engine according to claim 1, characterized in that the means for connecting the accelerator means includes a first rod means connected to the accelerator means, a slider means connected to the first rod means for enabling a predetermined free travel between the accelerator means and the control valve means, and a second rod means arranged between the slider means and the control valve means.

18. An internal combustion engine according to claim 17, characterized in that means are provided for rendering the connecting means between the accelerator means and the control valve means and a connection between the accelerator means and throttle valve means ineffective upon a malfunction of the engine.

19. An internal combustion engine according to one of claims 17 or 18, characterized in that means are provided for adjusting an ignition timing of the engine, and in that means are provided for connecting the ignition timing adjusting means with the accelerator means.

20. An internal combustion engine according to claim 19, characterized in that the means for connecting the ignition timing adjusting means with the accelerator means includes a drive lever means engageable with the second rod means following a predetermined amount of free travel.

21. An internal combustion engine according to claim 20, characterized in that means are provided for stopping the drive lever means, the stopping means are positioned in dependence upon a vacuum in a diaphragm chamber of the fuel pressure regulator means.

22. An internal combustion engine according to one of claims 1, 2, 3, or 4, characterized in that the control line means branches off from the air intake means at the fuel mixer means.

23. An internal combustion engine according to one of claims 1, 2, 3, or 4, characterized in that means are provided for adjusting an ignition timing of the engine, and in that means are provided for connecting the ignition timing adjusting means with the accelerator means.

* * * * *